Oct. 12, 1965  R. M. MANDEL  3,211,493
BULKHEAD STRUCTURE
Filed Nov. 29, 1961  3 Sheets-Sheet 1
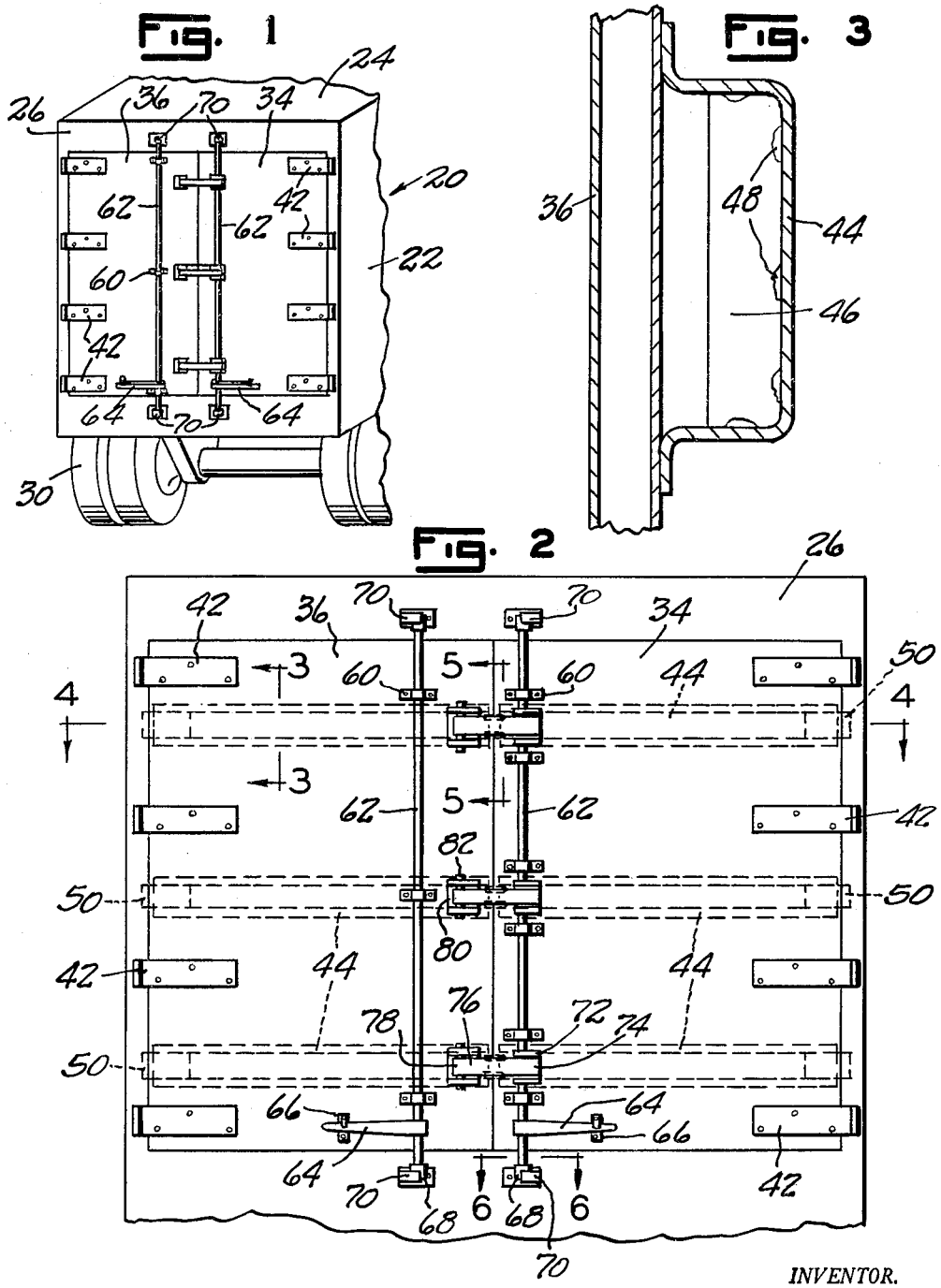
INVENTOR.
RICHARD M. MANDEL
BY
Eugene C. Knoblock
ATTORNEY

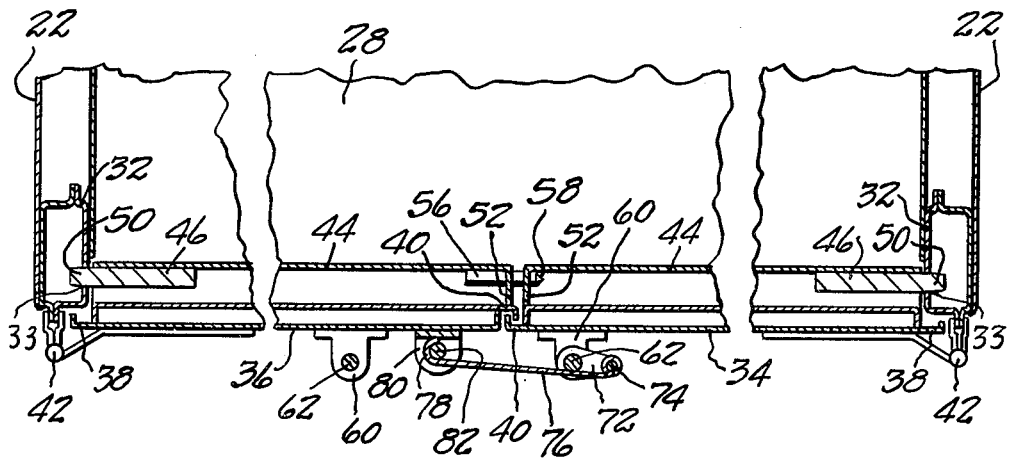
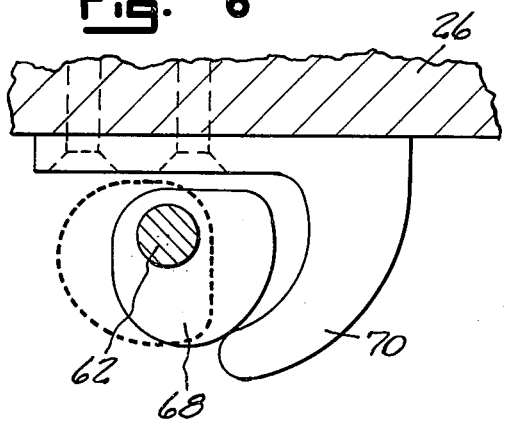
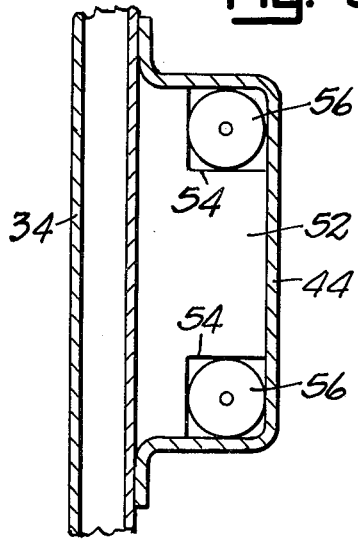

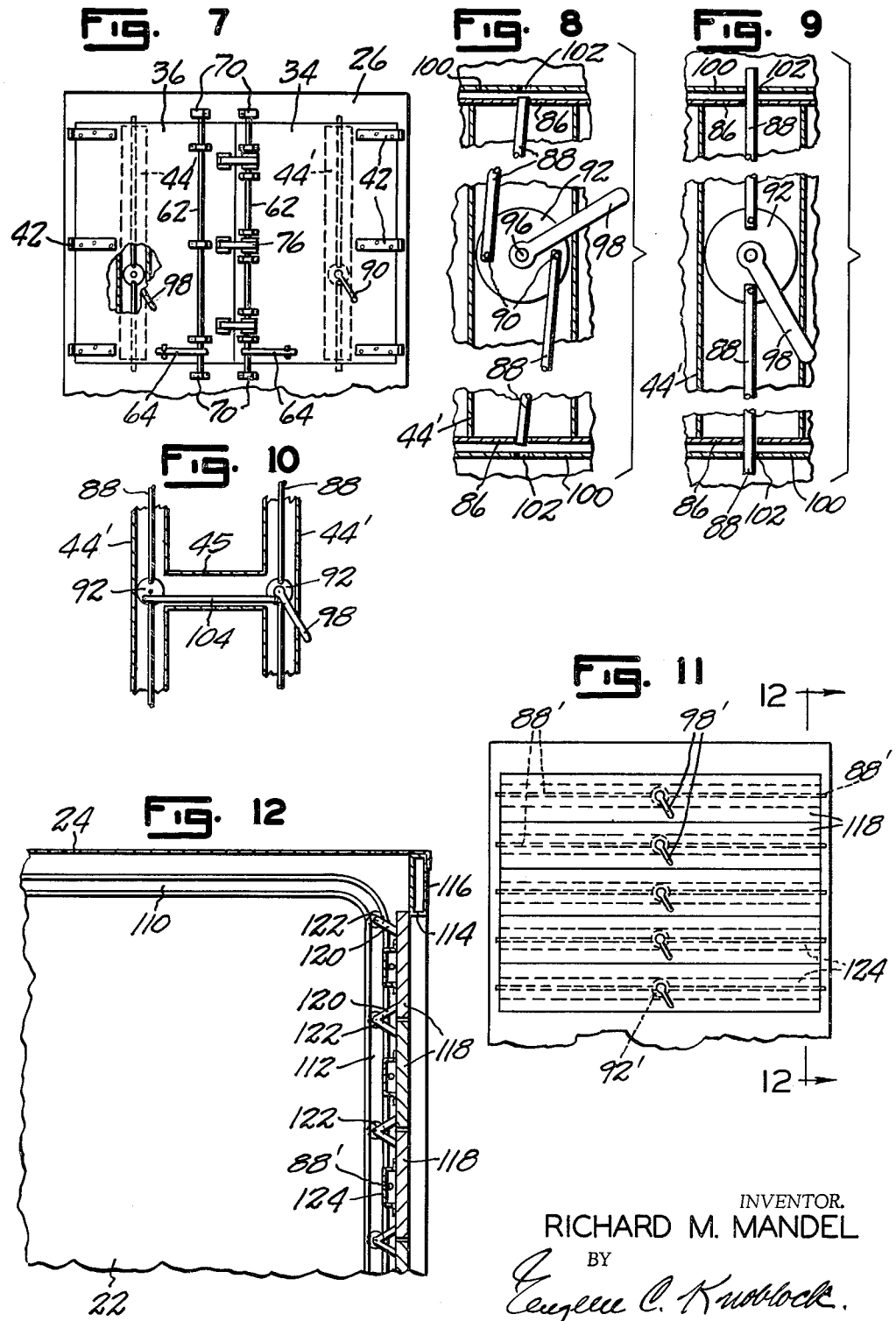

United States Patent Office 3,211,493
Patented Oct. 12, 1965

3,211,493
BULKHEAD STRUCTURE
Richard M. Mandel, Detroit, Mich., assignor to Copco Steel & Engineering Company, Warren, Mich., a corporation of Michigan
Filed Nov. 29, 1961, Ser. No. 155,633
1 Claim. (Cl. 296—50)

This invention relates to improvements in bulkhead structures for mobile storage compartments, and more particularly to doors for the storage compartments of load-carrying vehicles, such as trucks and semi-trailers.

The doors or bulkheads of mobile article carriers past which loads are inserted into the storage compartment and removed therefrom must be easily opened and closed and must be strong in their closed and locked position to insure that shifting of a load in transit will not rack, jam or deform the doors. Present truck door constructions commonly utilize two locking bars which engage brackets upon a truck body and serve to hold the free edges of the doors closed. Such doors are rapidly deformed upon impact of a load thereagainst.

In order to avoid or reduce damage to doors and bulkheads, due to shifting of a load, it is common practice to use reinforcing members, sometimes called "bull boards," which commonly are wooden members which removably engage brackets on rear vertical corner bars within the storage compartment. These bars are usually inserted before the doors are closed and locked, and they are effective to withstand shifting of a load in such a manner as to avoid or to reduce the incidence of deforming and racking of doors. However, since these members are separate from the doors, truck operators frequently forget or refuse to utilize them when they are provided and truck owners find frequent occurrences of damage to doors which would have been prevented had reinforcing members been utilized.

It is the primary object of this invention to provide a bulkhead construction which incorporates therein load-reinforcing means and interlocks between the reinforcing means and the body of the storage compartment, so constructed and designed as to provide automatic protection to doors and automatic positioning of reinforcing means and locks incident to the operation of closing a door or bulkhead unit.

A further object is to provide a bulkhead structure in which mechanical interlocks are provided between the bulkhead and the load-carrying structure at spaced points and in protected positions, and wherein the interlocking of parts occurs incident to the closing and locking of the bulkhead structure.

A further object is to provide a bulkhead structure with an externally actuable locking means and with internally projecting reinforcing members having associated therewith locking means engageable with the frame members outlining the opening in which the bulkhead structure fits so as to provide a plurality of spaced points of interlock between the bulkhead structure and the mounting structure.

A further object is to provide a bulkhead structure comprising a pair of pivoted doors mounted in the opening of a load-carrying member having apertures therein, wherein said doors are reinforced by members at their inner faces and are provided wtih locking means at their outer faces, said internal reinforcing members having associated therewith locking means which project into openings in the frame when the doors are closed and wherein the adjacent ends of the reinforcing members interfit incident to closing of the doors.

Other objects will be apparent from the following specification.

In the drawings:
FIG. 1 is a rear fragmentary perspective view of a truck body having loading doors constituting one embodiment of my invention;
FIG. 2 is a fragmentary outer face view of a bulkhead structure;
FIG. 3 is an enlarged fragmentary detail sectional view taken on line 3—3 of FIG. 2;
FIG. 4 is an enlarged fragmentary horizontal sectional view taken on line 4—4 of FIG. 2;
FIG. 5 is an enlarged fragmentary detail sectional view taken on line 5—5 of FIG. 2;
FIG. 6 is an enlarged fragmentary detail sectional view taken on line 6—6 of FIG. 2;
FIG. 7 is a fragmentary rear or outer view illustrating a modified embodiment of the invention;
FIG. 8 is an enlarged detail view of parts shown in section, illustrating the part of the locking mechanism in the embodiment illustrated in FIG. 7 in its open or released position;
FIG. 9 is a view similar to FIG. 8, illustrating the locking position of the structure;
FIG. 10 illustrates another modification of the construction illustrated in FIG. 7, wherein a plurality of locking mechanisms are interconnected for conjoint operation;
FIG. 11 is a view of the outer face of another type of bulkhead embodying another embodiment of my invention;
FIG. 12 is a fragmentary enlarged vertical sectional view taken on line 12—12 of FIG. 11.

Referring to the drawings which illustrate the preferred embodiment of the invention, and particularly to FIGS. 1 to 6, inclusive, which illustrate one embodiment of the invention, the numeral 20 designates a mobile load or cargo carrier, here illustrated as a wheeled vehicle having a load-carrying compartment outlined by side walls 22, top 24, end wall 26 having a large loading opening, and bottom 28. The mobile unit has a wheeled undercarriage 30 of any conventional character. It will be understood, however, that the invention is not limited to application to wheeled vehicles and is applicable in addition to stationary storage compartments which are subject to conditions which may cause shifting of a load therein and to marine storage compartments. The construction is preferably such that the load-carrying compartment is reinforced at the loading opening thereof. Thus in the form illustrated, tubular reinforcing frame structures 32 extend vertically at the portions of the back wall and side walls defining the loading opening. As shown these tubular reinforcing frame members 32 are positioned vertically and they are provided with a plurality of spaced vertical openings 33 therein for purposes to be described.

The bulkhead member in the embodiment illustrated in FIGS. 1 to 6 consists of a pair of door panels 34 and 36. These door panels are of any suitable construction and preferably are fabricated from a plurality of spaced metal panels suitable interconnected at their margins in the manner well understood in the art. As here shown in FIG. 4, the door panels 34 and 36 perferably include marginal projecting flanges 38 adapted to overlie portions of the carrier around the loading opening so as to provide an effective seal for the loading opening. Likewise the inner margins of the door panels 34 and 36 may include overlapping flanges 40 for sealing purposes. The door panels 34 and 36 are mounted upon the carrier by hinges 42 at their outer marginal portions, which hinges are preferably so constructed as to permit the door panels 34, 36 to swing to a position clear of the loading opening to facilitate loading therethrough.

Each of the door panels 34 and 36 mounts a plurality of reinforcing members 44, preferably extending in spaced parallel relation and preferably positioned horizontally, as illustrated in FIG. 2. The reinforcing members 44 are preferably channel-shaped members, as illustrated in FIG. 3, having flange portions which are welded or otherwise suitably secured to the inner face of each door throughout their length, so that racking, deforming and distortion of the doors is avoided when loads within the article compartment contact such reinforcing members 44. The reinforcing members 44 preferably extend full width of each of the doors 34 and 36. Each reinforcing member 44 mounts a latch bar 46 which may be welded thereto at 48 along its length, as illustrated in FIG. 3, and which projects beyond the end of the door and the end of the reinforcing member 44 at 50. The projecting portions 50 seat in the openings previously mentioned which are formed in the inner faces of the tubular frame 32 of the loading opening when the door panels 34 and 36 are closed, as illustrated in FIG. 4. The parts are so proportioned that, when the doors 34 and 36 are swung to open position, the projecting parts 50 of said latching members 46 will swing out of the openings in the reinforcing frame parts 32 to positions clear thereof. It will be apparent from the foregoing that, as a load which shifts within the article compartment engages the reinforcing members 44, the load so applied is transferred by the members 44 to the respective door panels and their mounting hinges, and also by the latch members 46, 50 to the reinforcing framework 32 of the compartment carrying the load.

At their inner ends, the reinforcing members 44 preferably carry end members 52, such as plates, each of which may have one or more openings 54 formed therein. Elongated locking bars or pins 56 are welded to the reinforcing members 44 of one door, as at the reinforcing members carried by the door panel 36, as best in FIG. 4. The bars 56 project beyond the reinforcing member by which they are mounted to an extent greater than the spacing of the adjacent plate members 52 when the doors are closed, and the bars 56 terminate in tapered or conical ends 58 adapted to enter the apertures 54 of the end plate 52 of the opposite reinforcing member 44. The bars 56 thus interconnect the reinforcing members 44 at the inner free margins of the door panels in such a manner as to transmit stresses from one reinforcing member 44 to the aligned reinforcing member 44 on the opposite door panel. This in effect serves to interconnect the two aligned reinforcing members 44 of adjacent door panels into a single continuous reinforcing member extending substantially full width of the loading opening of the cargo carrier and full width of the assembled bulkhead unit.

This unitizing of the reinforcing members occurs automatically incident to the operation of closing the doors and does not interfere with reopening of the doors when that is desired.

Any suitable external latching means may be employed. As here illustrated, each of the door panels 34 and 36 carries a plurality of vertically aligned journal brackets 60 within which are journaled locking bars 62. In the form here shown, the locking bars 62 are located adjacent the free vertical margins or inner edges of the door panels 34 and 36, and each is of a length to project vertically beyond the door panel at both the upper and lower margins thereof. Each of the locking bars 62 carries a handle 64 and may be provided with positioning means 66 carried by the door panel and serving to releasably lock the bars 62 in closed position. The upper and lower ends of the bars 62 may carry cam-shaped latching members 68 engageable with latch retainers 70 in latching position, as illustrated in FIG. 6, said retainers 70 being mounted by the rear panel or wall 26 of the cargo carrier above and below the door opening.

The doors are preferably provided with means by which they may be drawn edgewise toward each other as they are being locked in closed position. Thus one of the locking bars 72, here illustrated as the righthand locking bar in FIGS. 2 and 4, may mount a plurality of crank members 72, to the free ends of which at 74 are pivoted elongated rigid members 76, such as plates, which terminate in bent or hook-shaped ends 78. The opposite door panel, such as the door panel 36 as seen in FIG. 2, is provided with a plurality of brackets 80 aligned with the hook members 76, 78, and carrying bars 82 engageable by the hooks 78, as seen in FIG. 4, when the rotatable bars 62 are positioned to interlock the free margins of the door panels 34 and 36 with the frame or body of the cargo carrier, as at the interlocking parts 68 and 70.

It will be observed that the construction of the embodiment illustrated in FIGS. 1 to 6 provides for multiple spaced interlocks between the door or bulkhead members and the load-carrying member incident to the operation of closing and locking the doors or bulkheads from the outside of the structure. Thus, assuming that the cargo carrier has been loaded, the door panels 34 and 36 are swung to closed position spanning the loading opening of the cargo carrier and as they swing to this closed position the ends 50 of the latch bars 46 enter openings in the reinforcing frame 32 of the cargo carrier around the loading opening. At the same time, the projecting ends 58 of the bars 56 at the inner end of one door panel, such as panel 36, seat in openings 54 in end member 52 of the reinforcing member of the opposite door panel to interconnect the two door panels at their meeting edges. Thereupon, the locking bars 62 are manipulated to cause interengagement of the cam locks 68 thereof with the retainers 70 upon the cargo carrier, and simultaneously the hook members 76, 78 are engaged with the brackets 80, 82.

The bulkhead unit provided when the structure is locked is strong and is interlocked with the load carrier at multiple points around the loading opening, namely, at the interlock between the parts 68 and 70 adjacent the upper and lower margins of the bulkhead structure and at parts 32, 46 spaced at the vertical margins of the bulkhead structure. Interconnection between the parts of the bulkhead is also effected by the members 56.

As a result of this structure, if a load within the cargo carrier shifts toward the bulkhead, it comes into contact with the interiorly projecting reinforcing members 44. This localizes the points of application of stress by the shifted load against the bulkhead, and this stress is taken not only by the doors and their hinges 42 but also by the latch members 46 which interlock with the frame parts 32. At the same time the stress of the load is transmitted from one reinforcing member to the aligned reinforcing member 44 by the locking pin 56. This structure thus distributes the stress applied by a shifted load to multiple points upon the load carrier around the loading opening, and thus enables stresses to be sustained with no risk of racking, jamming or deforming of the door panels.

Another embodiment of the invention is illustrated in FIGS. 7, 8 and 9, wherein parts similar to those illustrated and employed in the embodiment illustrated in FIGS. 1 to 6, bear the same reference numerals. In this construction, reinforcing channels 44' extend vertically substantially full height of the door or bulkhead panels 34 and 36. The reinforcing members 44' are located at the inner surface of the door or bulkhead panels 34 and 36, and are preferably channel members. Each reinforcing member 44' is closed at its opposite ends by end plates 86 having central apertures therein within which are slidably received the free end portions of a latching bar 88. A pair of latching bars are provided, each being pivotally connected at 90 to a rotatable member 92 located within the reinforcing member 44' and journaled thereto or to the door panel. A shaft 96 projects from the member 92 through the door panel to terminate exteriorly thereof and operating handle 98 is mounted upon the shaft 96 externally of the door panel. The upper and lower portions of the cargo loading opening are outlined by plates 100 which have apertures 102 which are aligned with the apertures in the reinforcing member ends 86.

In this embodiment of the invention, the operator is required to manipulate the handle members 98 in addition to the handle members 64 in order to effect a full interlock of the bulkhead parts with the cargo carrier. However, he is not required to handle or assemble or disassemble parts and each of the actuating mechanisms is readily accessible and available for manipulation incident to the operation of closing the bulkhead. The same advantages of reinforcing of the bulkhead parts and of anchorage of the bulkhead to the load carrier at parts at which stress is exerted by contact of a load with a reinforcing member is provided. It will be noted in FIG. 9 that the operative position of the latching members associated with reinforcing members 44' entails projection of locking bars 88 into openings 102 in the carrier or its frame at a point closely adjacent to the point at which the locking bar is guided and positioned relative to the reinforcing member 44' by the aperture in the end plate 86 of said reinforcing member.

In instances where more than one reinforcing member 44' is carried by each of the constituent parts of the bulkhead, interlocking means, such as the bars 88, associated with each reinforcing member may be interconnected for conjoint operation, as illustrated in FIG. 10. In the FIG. 10 construction, the adjacent reinforcing members 44' are interconnected by a reinforcing member 45 extending transversely therebetween. The locking bars 88 are connected to rotatable members 92 located adjacent the cross reinforcing members 45. The rotatable members 92 are pivotally connected by a tie bar 104. Only one of the rotatable members 92 carries a handle 98, and it will be apparent that manipulation of that single handle will effect manipulation of the locking members 88 connected to the individual rotatable members 92 which are connected in turn by the crossbar 104.

Another embodiment of the invention is illustrated in FIGS. 11 and 12 wherein the cargo carrier mounts a track 110 therein extending adjacent the top 24 substantially horizontally and including a substantially upright track portion 112 adjacent the loading opening 114 of the cargo carrier, which loading opening is preferably outlined by a frame supporting structure 116.

The bulkhead comprises a plurality of panels 118 which are connected by hinge means (not shown) and which mount brackets 120 carrying rollers 122 which traverse the track members 110, 112. The construction may be of any type found suitable and known in the art as roll-up doors or bulkheads.

Each of the door panels 118 carries a reinforcing member 124, such as a channel, which extends full length thereof. Locking bars 88', similar to those illustrated in FIGS. 8 and 9, are mounted within each reinforcing member 124, being pivotally connected to a rotatable member which is actuable by an externally located operating handle 98'. The outer ends of the locking bars 88' are adapted to engage in latching openings in the frame of the cargo carrier when the bulkhead is in closed position and the locking handle associated with each at 98' has been manipulated to closed or locking position.

In this embodiment of the invention, the same advantages of multiple interlocks between the bulkhead and the structure surrounding the opening which the bulkhead spans are provided as is true in the previously described embodiments. Note in this instance the multiple locks and also the fact that each lock occurs adjacent to a reinforcing member 124 at which stress is applied to the bulkhead by a shifted load. Thus a roll-up type of bulkhead may be protected against racking or deforming thereof incident to shifting of a load as well as a bulkhead which is mounted pivotally.

While the preferred embodiments of the invention have been illustrated and described, it will be understood that changes in the construction may be made within the scope of the appended claim without departing from the spirit of the invention.

I claim:

In combination,
a load carrier having an access opening and a frame outlining at least part of said opening,
a pair of doors pivoted to said carrier and spanning said opening in closed position,
means for releasably locking said doors in closed position including interfitting parts on said carrier and doors and an actuator accessible from the exterior of said doors,
a reinforcing member carried by each door at its inner face and extending at an angle to the pivot axis of said door and having inner and outer ends,
said frame having an opening adjacent each reinforcing member,
a latching bar projecting longitudinally from each reinforcing member and seating in a frame opening when the door mounting said reinforcing member is closed,
the inner ends of the reinforcing members of said doors being positioned adjacent each other when said doors are closed,
one of said reinforcing members having a socket at its inner end, and
a locking bar adapted to project from the inner end of the other reinforcing member and into said socket of said one reinforcing member.

References Cited by the Examiner

UNITED STATES PATENTS

| 964,020 | 7/10 | Heintzelman | 189—46 X |
| 998,941 | 7/11 | Alvey | 20—28 |
| 1,688,140 | 10/28 | Gilpin | 189—46 |
| 1,811,312 | 6/31 | Fildes. | |
| 2,028,771 | 1/36 | Fitch | 189—46 |

FOREIGN PATENTS

| 441,149 | 1/36 | Great Britain. |

A. HARRY LEVY, Primary Examiner.

LEO FRIAGLIA, Examiner.